Patented Jan. 18, 1944

2,339,621

UNITED STATES PATENT OFFICE 2,339,621

CONDENSATION PRODUCT AND METHOD OF PREPARING THE SAME

Gaetano F. D'Alelio, Pittsfield, Mass., assignor to General Electric Company, a corporation of New York No Drawing. Application December 3, 1941, Serial No. 421,491

4 Claims. (Cl. 260—69)

This invention relates to new condensation products and to methods of making the same. Generally, it is concerned with resinous compositions prepared from novel compounds containing imino, amino, and amido groups. Specifically, it is concerned with, and has as its principal object the preparation of, resinous compositions obtained as condensation products of ingredients comprising an aldehyde and certain novel substituted or unsubstituted mono- or di-carbamidomethyl ureas having the general structural formula $RHNCYNR(CHR'NRCYNR)_nH$ in which Y represents oxygen or sulphur, R' represents hydrogen or any monovalent hydrocarbon radical of not more than six carbon atoms, and R represents hydrogen or any monovalent hydrocarbon radical, whether saturated or unsaturated, substituted or unsubstituted, aliphatic, carbocyclic, aryl, or heterocyclic, mono- or polynuclear, etc., and n has a value of 1 or 2. Examples of suitable hydrocarbon radicals represented by R are aliphatic (e. g. methyl, ethyl, propyl, isopropyl, butyl, secondary butyl, butenyl, amyl, hexyl, allyl, etc.) including cycloaliphatic e. g. (cyclopentyl, cyclopentenyl, cyclohexyl, cyclohexenyl, cycloheptyl, etc.); aryl (e. g. phenyl, diphenyl, naphthyl, etc.); alkyl substituted aryl (e. g. tolyl, xylyl, ethylphenyl, isopropylphenyl, allyl phenyl, etc.); aryl substituted alkyl (e. g. benzyl, phenylethyl, phenyl allyl, etc.); and their homologues, as well as those groups with one or more of their hydrogen atoms substituted by a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc. Preferably R and R' in the above formula are hydrogen.

The novel derivatives represented by the above formula when n equals 1 may be prepared by reacting, in the cold, a concentrated aqueous solution of one mol of a substituted or unsubstituted monocarbinol urea or thiourea of the formula

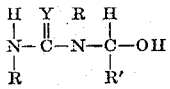

with a concentrated aqueous solution of one mol of a substituted or unsubstituted urea or thiourea of the formula

wherein R, R' and Y represent the various groups hereinbefore indicated. Similarly the compound represented by the generic formula when n equal 2 may be prepared by mixing a cold concentrated solution of a dicarbinol urea or thiourea with a cold concentrated solution of a urea or thiourea in the mol ratio of 1:2.

As a more specific example of the preparation of my novel starting materials, a cold concentrated solution of 2 mols of urea is mixed with a cold concentrated solution of dimethylol urea and the subsequent reaction allowed to proceed in the cold with the formation of symmetrical dicarbamidomethyl urea having the formula $H_2NCONH(CH_2NHCONH)_2H$.

Examples of monocarbinol or dicarbinol ureas, other than the monomethylol or dimethylol ureas which may be used are: mono- and di-methylcarbinol urea and thiourea, mono- and di-methylol phenyl urea and thiourea, mono- and di-methylol allyl urea and thiourea, etc.

Examples of substituted ureas and thioureas which may be used in the preparation of all or some of my reactive derivatives are the mono-, or N, N'-di-alkyl or aryl-ureas or thioureas, for instance, mono-, symmetrical di-methyl ureas or thiourea, N-methyl N'-ethyl urea or thiourea, phenyl urea or thiourea, N-methyl N'-phenyl urea or thiourea, etc.

Preferably the cold concentrated solutions of the two reactants are mixed and held at a temperature between 0° and —20° C. The products of the reaction crystallize out on standing or on evaporation of the excess water at or below room temperature under atmospheric or subatmospheric pressures. Alternatively, the product may be recovered by adding to the aqueous solution of the reaction product a suitable water-miscible precipitant for the reaction product, which precipitant is incapable of reacting with the desired product at operating temperatures.

The resulting compounds may be resinified by reaction with aldehydes or aldehyde engendering substances, preferably under the influence of heat, the unsubstituted derivatives of the formula $NH_2CYNH(CH_2NHCONH)_nH$ being most easily resinified under such conditions. The relative ease of resinification decreases with increased replacement of the various substitutable hydrogens by hydrocarbon radicals. Resinification may be accomplished by heating the reactants alone, in inert mediums, or in inert solvents such as water. Resinification may be accelerated by the addition or presence of basic materials, acidic materials, neutral, acid, or alkaline salts. Reactive media may likewise be used to achieve resinification as hereinafter shown.

This novel class of organic compounds may be mixed with resin intermediates containing carbinol ($—CR_2OH$) groups, such as monomethylol ureas, dimethylol ureas, phenol methylols, the methylols of cyclic amidines, e. g., methylol melamines, methylol guanazoles, etc.; then co- or interresinified alone or in the presence of other modifying bodies to give intercondensed resins.

The novel compounds of this invention, particularly the highly substituted compounds, may be used as plasticizers for many resins. In many cases they themselves become resinous during the plasticizing process, while in other cases they condense with the other resinous intermediate during manufacturing operations. Specifically, these materials may be used (1) unconverted as plasticizers, (2) partly or completely converted as plasticizers, (3) partly or completely intercondensed to exert a plasticizing effect. The final and intermediate resins prepared from the novel materials of this invention alone or with the modifications expressed herein are extremely compatible with many other natural or synthetic resins in their intermediate or ultimate stages.

Before, during, or after the resinification process, the reaction between the aldehyde or mixture of aldehydes and the novel compounds of this invention may be modified by the presence of suitable amounts of a large class of compounds, for example, hydroxy compounds, e. g. methyl, ethyl, propyl, isopropyl, butyl, amyl, tertiary amyl, benzyl, furfuryl, tetrahydrofurfuryl, cyclohexyl, phenethyl, naphthyl, polyvinyl, allyl, methallyl, crotyl, 1-chlorallyl, propargyl, 2-chlorallyl, cinnamyl, alcohols, etc., glycol, diethylene glycol, triethylene glycol, polyethylene oxide, glycerine, pentaerythritol, saligenin, phenol, cresol, xylenol, resorcinol, catechol, pyrogallol, etc., chlorohydrin, epi-chlorohydrin, nitrobutanol, diacetone alcohol, ethylene oxide, propylene oxide, etc., ammonia and its amino, amido, or imino compounds, e. g., methylamine, dimethylamine, hydroxylamine, hydrazine, phenyl hydrazine, diamylamine, stearyl amine, cyclohexyl amine, aniline, di-phenylamine, diaminobenzene, triaminobenzene, aminophenol, nitro aniline, piperazine, ethanolamine, di-isopropanolamine, triethanolamine, propanolamine, ethylene diamine, formamide, acetamide, propionamide, lauramide, acrylic amide, methacrylic amide, atropic amide, malonic diamide, itaconic diamide, succinic diamide, citraconic triamide, benzamide, phthalic diamide, phthalimide, benzosulfimide, aminobenzene sulfonamide, benzene disulfonamide, benzene trisulfonamide, anthranilic esters, anthranilamide, salicylamide, para-phenyl benzene sulfonamide, tolyl amide, etc.; the amino 1,3,5-triazines, e. g., 2,4,6-triamino 1,3,5-triazine, 2-amino 1,3,5-triazine, 2,4-diamino 1,3,5-triazine; the diazines, e. g., 2,4,6-triaminopyrimidine, the diamino pyrimidine thio esters; the amino 1,2,4-triazoles, e. g., guanazole, phenyl guanazole, dihydrazino 1,2,4-pyrrodiazole, guanazo-guanazole, imidurazo-guanazole; the amino 1,2-diazoles, e. g., 3,5-diaminopyrazole, the urea type compounds, e. g., urea, methylurea, monomethylol urea, phenyl urea, thiourea, phenyl thiourea, unsymmetrical diphenyl urea, unsymmetrical ethyl phenyl urea, hydroxy urea, ethanol urea, unsymmetrical diethanol urea, guanidine, aminoguanidine, biguanidine, di-cyandiamide, guanyl urea, guanyl thiourea; the proteins, e. g., casein, soya bean protein, alfalfa protein, gelatin, coffee bean protein, alkyd resins having free hydroxyl groups such as glyceryl phthalate, coil-modified glyceryl phthalate, diethylene glycol succinate, triethylene glycol maleate, glyceryl maleate, etc.; nitriles, e. g., acetonitrile, propionitrile, butyronitrile, benzonitrile, acrylonitrile, methacrylonitrile, atropic nitrile, ethylene cyanohydrin, acetone cyanohydrin, aminoisobutyronitrile, aminoacetonitrile, etc.; esters such as lactic esters, hydroxy isobutyric esters, acetoacetic ester, malonic esters, etc.

The final and intermediate resins and condensation products prepared from the novel materials of this invention alone or with the modifications already expressed are extremely compatible with many other natural or synthetic resins in their intermediate or ultimate stages.

This novel class of compounds, when reacted with aldehydes, alone or with modifications, will form self-curing aminoplasts by condensation with curing reactants, such as chloroacetonitrile, nitrourea, glycine, amino-propanol hydrochloride, mono-, di- or tri-chloroacetamides, alpha, beta-dibromopropionitrile, alpha, beta-dichloropropionitrile, alpha-methyl, alpha, beta-dichloropropionitrile, aminoacetamide hydrochloride, ethylene diamine monohydrochloride, sulfamic acid, chloroacetyl urea, citric diamide, phenacyl chloride and others mentioned, for example, in my copending applications Serial No. 346,962, filed July 23, 1940, and Serial No. 354,395, filed August 27, 1940, both of which applications are assigned to the same assignee as the present invention.

The initial reaction leading to the formation of the new condensation products of ingredients comprising an aldehyde and my novel compounds may be carried out at normal or at elevated temperatures, at atmospheric or superatmospheric pressures, and in the presence or absence of an acid or of an alkaline condensing agent which may be either a direct catalyst or a reactant catalyst. A catalytic reactant or reactant catalyst is defined as a substance which accelerates the reaction between the aldehyde and the aldehyde reactable component or components while it itself becomes an integral part of the condensation product. Preferably the reaction between the components is started under alkaline conditions.

Examples of other substances yielding alkaline aqueous solutions may be used in obtaining alkaline conditions for the initial condensation reaction are alkalis such as sodium, potassium and calcium hydroxides, sodium and potassium carbonates, mono-, di- and tri-amines, etc. Best results are obtained by causing the condensation reaction between the primary components to take place in the presence of a primary condensation catalyst and a secondary condensation catalyst. To obtain condensation products having optimum time- or storage-stability characteristics, I have found that the primary catalyst should be a member of the class consisting of (1) nitrogen-containing basic tertiary compounds that are aldehyde-non-reactable, e. g. tertiary amines such as trialkyl (for example, trimethyl, triethyl, etc.) amines, triaryl (for example, triphenyl, etc.) amines, etc. and (2) nitrogen-containing basic compounds that are aldehyde-reactable, for instance, ammonia, primary amines (e. g. ethyl amine, propyl amine, etc.), and secondary amines (e. g. dipropyl amine, dibutyl amine, etc.). Catalytic reactants that may be used include substances such as tri-carbamidomethyl amine, $N(CH_2NHCONH_2)_3$ or other substituted or unsubstituted mono-, di- or tri-carbamidomethyl amines or substituted or unsubstituted mono-, di- or tri-(mono-carbinol-ureidomethyl) amines such as are disclosed in my copending applications Serial Nos. 409,017 to 409,022, inclusive, filed August 30, 1941, and assigned to the same assignee as the present invention.

The secondary condensation catalyst, which ordinarily is used in an amount less than the amount of primary catalyst, should be a fixed alkali, for instance a carbonate, cyanide or hydroxide of an alkali metal (e. g. sodium, potassium, lithium, etc.).

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively, I may first condense either my compound, or some other aldehyde reactable material such as a urea, a phenol, a melamine or the like, with a suitable aldehyde and thereafter at any stage of the original reaction, I may add the remaining aldehyde-reactable ingredient or ingredients. Or I may condense or partially condense my novel compounds with an aldehyde, add the resulting product to a urea-aldehyde, a phenol-aldehyde, or some other partial condensation product of an aldehyde and an aldehyde reactable body and then cause the reaction to proceed further. Still other ways may be employed in combining the components in producing the modified or unmodified products of this invention, as will readily be understood by those skilled in the art from the following examples covering the preparation of resinous products from monocarbamidomethyl urea having the formula

or symmetrical di-carbamidomethyl urea having the formula

*Example 1*

|  | Mol ratio (approx.) | Parts by weight |
|---|---|---|
| Mono-carbamidomethyl urea | 1 | 18 |
| Aqueous formaldehyde | 2 | 21.9 |
| NaOH (in 2.5 parts water) | .01 | 0.05 |

The aqueous formaldehyde used in this and subsequent examples was a commercial formaldehyde solution containing 37.5 per cent $CH_2O$. The mono-carbamidomethyl urea was prepared by mixing cold concentrated solutions of 1 mol monomethylol urea and 1 mol urea and recovering the monocarbamidomethyl derivative which crystallized from the mixture. This derivative was mixed with the formaldehyde and sodium hydroxide solution and the mixture refluxed at the boiling temperature of the mass for 20 minutes. A resinous syrupy product was obtained which was cloudy while hot and which precipitated on cooling. The syrup had a pH of 6.5. When tested at 140° C. the resinous syrup has a very slow and rubbery cure. The addition of a small amount of (for example, 0.5 per cent by weight) a curing agent, specifically chloroacetamide, produced a composition having a fast, hard cure at 140° C.

*Example 2*

|  | Mol ratio (approx.) | Parts by weight |
|---|---|---|
| Di-carbamidomethyl urea (containing 5% $H_2O$) | 1 | 100.5 |
| Aqueous formaldehyde | 4 | 157.0 |

The above ingredients were refluxed for 30 minutes. The syrupy product was very thick and clear while hot. On cooling, a white paste developed. At 130° C. the paste melted down and cured quickly to a very hard mass. This example illustrates an acid catalyzed condensation since commercial formaldehyde contains formic acid.

*Example 3*

|  | Mol ratio (approx.) | Parts by weight |
|---|---|---|
| Di-carbamidomethyl urea (containing 5% $H_2O$) | 1 | 100.5 |
| Aqueous formaldehyde | 4 | 157.0 |
| NaOH (in 8 parts water) | 0.01 | 0.16 | were refluxed for 30 minutes. The resultant syrup was clear while hot and also clear on cooling. It had a pH of 8.75 and contained 51 per cent resin solids. It did not cure alone at 130° C. The addition of small amounts of various curing agents to the syrup caused it to cure or harden within reasonable periods of time. A good, hard cure was obtained with chloroacetamide and phenacyl chloride. The cure obtained with citric acid and alpha, beta-dibromopropionitrile was very fast. Chloral urea gave a slow cure as compared with the previously mentioned agents.

A molding compound was made by mixing 9 parts alpha flock with a solution of 0.11 part chloroacetamide in 21 parts of the above resin syrup and air-drying the mixture for 48 hours. The compound has good moldability and a hard cure when molded at 135° C. and 6000 pounds per square inch pressure for 5 minutes. The molded product was light-colored. A well cured piece may also be obtained by using alpha, beta-dichloropropionitrile in place of chloroacetamide in the above example.

*Example 4*

|  | Mol ratio (approx.) | Parts by weight |
|---|---|---|
| Di-carbamidomethyl urea (containing 5% $H_2O$) | 1 | 100.5 |
| Aqueous formaldehyde | 4 | 145.0 |
| $NH_3$ | ⅛ | 1.0 |
| NaOH (in 10 parts water) | 0.01 | 0.2 |

The above was refluxed for 30 minutes to produce a syrup which was clear while hot and at room temperature. It had a pH of 8.7. At 140° C. the syrup did not cure without the addition of a curing agent. It had a fast cure with chloroacetamide and alpha, beta dichloropropionitrile, a rubbery cure with polysalicylic acid, a very fast cure with nitrourea, and a slow cure with oxamide. A molding compound prepared from 22 parts syrup, 9.2 parts alpha flock, and 0.11 part chloroacetamide, using the mixing and molding procedure set forth in the previous example, had good moldability, a hard cure, and was light-colored. Similar results may be obtained by the use of alpha, beta-dichloropropionitrile in place of the chloroacetamide.

*Example 5*

|  | Mol ratio (approx.) | Parts by weight |
|---|---|---|
| Di-carbamidomethyl urea (containing 5% $H_2O$) | 1 | 100.5 |
| Acrolein | 4 | 110 |
| NaOH (in 5 parts water) | 0.005 | 0.10 |

The urea derivative was dissolved in the acrolein and the NaOH solution added. Reaction occurred, a precipitate appeared and the syrup turned yellow. The syrup was refluxed for 8 minutes at the end of which time it was quite thick. When tested on the hot plate at 140° C., the syrup had practically no tendency to melt and turned to a hard powder very quickly.

*Example 6*

|  | Mol ratio (approx.) | Parts by weight |
|---|---|---|
| Aqueous di-carbamidomethyl urea (28% conc.) | 1 | 35.7 |
| Aqueous N(CH$_2$NHCONH$_2$CH$_2$OH)$_3$ (25% conc.) | 0.1 | 6.3 |
| Aqueous formaldehyde | 4 | 15.7 |

The above were refluxed for 30 minutes. The resultant syrup was clear while hot and cloudy on cooling. It had a pH of 5.35 and contained 47 per cent resin solids. At 130° C. the syrup did not cure alone. A good cure was obtained with small additions of citric acid. Chloroacetamide gave a very good cure.

Following the procedure set forth in Example 3, a molding compound prepared from 47 parts resin syrup, 17.9 parts alpha flock, and 0.22 part chloroacetamide, was molded at 135° C. and 6000 pounds pressure for 5 minutes. It had a good, hard cure and the molded piece was light-colored and translucent.

*Example 7*

|  | Mol ratio (approx.) | Parts by weight |
|---|---|---|
| Aqueous di-carbamidomethyl urea (28% conc.) | 1 | 357.0 |
| Urea | 1 | 29.4 |
| Aqueous formaldehyde | 6 | 235.0 |

The above were refluxed for 30 minutes. A precipitate appeared in the hot reaction mass. At 130° C., the product had a very good cure. The addition of chloroacetamide accelerated the cure and produced a powdery cured mass. A molding compound consisting of a mixture of 59 parts of resin and 22.5 parts alpha flock, which mixture had been air-dried for 48 hours and thereafter oven-dried at 70° C. till dry, was molded at 135° C. and 6000 pounds per square inch pressure for 5 minutes. The compound had a fairly soft cure. The molded piece had a rather dull surface and was opaque. Repeating the prepartion of the molding compound but incorporating 0.5 part chloroacetamide or alpha, beta-dichloropropionitrile produced a molded piece that was hard and glossy and had good water resistance.

*Example 8*

|  | Mol ratio (approx.) | Parts by weight |
|---|---|---|
| Aqueous di-carbamidomethyl urea (28% conc.) | 1 | 357.0 |
| Thiourea | 1 | 37.3 |
| Aqueous formaldehyde | 6 | 235.0 | were refluxed for 29 minutes to form a syrup which was clear while hot and cloudy at room temperature and which had a pH=4.65. It had a good cure at 130° C. With chloroacetamide, the cure was very fast. A molding compound consisting of a mixture of 59 parts syrup and 22.5 parts alpha flock, which had been dried at room temperature for 48 hours and oven-dried at 50° C. till dry, was molded at 135° C. and 6000 pounds per square inch pressure for 5 minutes. The compound had a good cure and the molded article was hard and had a slightly yellow cast.

*Example 9*

|  | Mol ratio (approx.) | Parts by weight |
|---|---|---|
| Aqueous di-carbamidomethyl urea (28% conc.) | 1 | 357.0 |
| Para toluene sulfonamide | 1 | 83.8 |
| Aqueous formaldehyde | 6 | 235 |

The resin syrup obtained by refluxing the above for 30 minutes was clear while hot and precipitated on cooling. It had a long rubbery cure at 130° C. The cure was accelerated and fairly hard with small additions of chloroacetamide.

*Example 10*

|  | Mol ratio (approx.) | Parts by weight |
|---|---|---|
| Aqueous di-carbamidomethyl urea (28% conc.) | 1 | 357.0 |
| Phenol | 1 | 46.0 |
| Aqueous formaldehyde | 6 | 235.0 |
| NaOH (in 10 parts water) | 0.01 | 0.2 | were refluxed for 15 minutes. The syrupy product, which had a pH of 7.2, was clear at reflux and room temperatures. Samples of the syrup did not cure alone at 130° C. but with the addition of chloroacetamide, an excellent, prolonged cure was obtained. A very good molding compound was made by adding 2.75 parts chloroacetamide to the syrup, refluxing the mixture for 10 minutes and then mixing in 250 parts alpha flock. The compound was dried at 70° C. before molding.

*Example 11*

|  | Mol ratio (approx.) | Parts by weight |
|---|---|---|
| Aqueous di-carbamidomethyl urea (28% conc.) | 1 | 357.0 |
| Melamine | 1 | 61.8 |
| Aqueous formaldehyde | 7 | 274.0 |

The above were refluxed for 19 minutes. The resultant syrup, which was clear while hot but cloudy on cooling, did not cure alone at 130° C. With small additions of chloroacetamide, the cure was excellent.

*Example 12*

|  | Mol ratio (approx.) | Parts by weight |
|---|---|---|
| Aqueous di-carbamidomethyl urea (28% conc.) | 1 | 357.0 |
| Dimethylol urea (containing 11% H$_2$O) | 12 | 792.0 |
| NH$_3$ (in aqueous solution) | 1/8 | 1.0 |
| Distilled water |  | 1,000 |

The syrup obtained after refluxing the above mixture for 30 minutes was clear while hot and precipitated on cooling. It had a pH of 6.6. The syrup did not cure alone at 130° C. With chloroacetamide a very good cure with a prolonged tacky stage was obtained.

Example 13

|  | Mol ratio (approx.) | Parts by weight |
|---|---|---|
| Aqueous di-carbamidomethyl urea (28% conc.) | 1 | 357 |
| Aqueous trimethylol melamine (50% conc.) | 1 | 210 |
| Aqueous formaldehyde | 7 | 274 |
| $NH_3$ (in aqueous solution) | ⅓ | 1.0 |

The urea derivative was mixed with the formaldehyde and the mixture was brought to reflux. The melamine methylol was then added and reflux continued for 30 minutes. The syrup product was clear while hot and cloudy on cooling. It had a pH of 6.55. The cure alone at 130° C. was very slow and rubbery. With chloroacetamide, it was excellent and hard.

Example 14

|  | Mol ratio (approx.) | Parts by weight |
|---|---|---|
| Aqueous di-carbamidomethylol urea (28% conc.) | 1 | 357 |
| Aqueous formaldehyde | 4 | 157 |
| Glycerine | 10% | 16 |
| NaOH (in 10 parts water) | 0.01 | 0.2 |

The above were refluxed for 30 minutes to form a syrup that was clear while hot and cloudy on cooling. It had a pH of 6.85. At 130° C. it did not cure alone. With the addition of chloroacetamide, the cure was slow and rubbery.

Example 15

|  | Mol ratio (approx.) | Parts by weight |
|---|---|---|
| Aqueous di-carbamidomethyl urea (28% conc.) | 1 | 357 |
| Aqueous formaldehyde | 4 | 157 |
| Butyl alcohol | 20% | 32 |
| NaOH (in 10 parts water) | 0.01 | 0.2 | were refluxed for 30 minutes. The resinous syrup so obtained was clear while hot and cloudy on cooling. It had a pH of 7.0 When heated on the hot plate, it bodied to a clear, hard resin.

Example 16

|  | Mol ratio (approx.) | Parts by weight |
|---|---|---|
| Aqueous di-carbamidomethyl urea (28% conc.) | 1 | 357.0 |
| Aqueous formaldehyde | 4 | 157.0 |
| Diethyl malonate | 20% by weight | 32.0 |
| NaOH (in 10 parts water) | 0.01 | 0.2 | were refluxed for 30 minutes. The resultant syrup was clear while hot and cloudy on cooling and had a pH of 6.8. At 130° C., it had no apparent tendency to cure alone. With chloroacetamide, the cure was very slow, but good.

Example 17

|  | Mol ratio (approx.) | Parts by weight |
|---|---|---|
| Aqueous di-carbamidomethyl urea (28% conc.) | 1 | 357.0 |
| Aqueous formaldehyde | 4 | 157.0 |
| $NH_3$ (in aqueous solution) | ⅓ | 1.0 |
| Acetamide | 20% | 3.2 |

The above were refluxed for 30 minutes. The resulting syrup having a pH of 4.9 was clear while hot and cloudy on cooling. At 130° C. the cure alone was very slow and soft. The addition of chloroacetamide gave a product that cured quickly to a hard state.

Although in the above examples I have shown that satisfactory molding compounds can be made without the use of curing agents, or curing reactants, the use of such curing accelerators is recommended where molded pieces having maximum gloss and water resistance and minimum molding time are desired.

In producing any of these new condensation products, the choice of the aldehyde component is dependent largely upon economic considerations and the particular properties desired in the finished product. I prefer to use as the aldehyde reactant, formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Various aldehyde-addition products may be used instead of aldehydes. Such products include the mono- and poly (N-carbinol) derivatives, more particularly the mono- and polymethylol derivatives, of urea, thiourea, selenourea, and iminourea, substituted ureas, thioureas, selenoureas, and iminoureas, amides of polycarboxylic acids, e. g., maleic, itaconic, fumaric, adipic, malonic, citric, phthalic, etc. I may also use with particularly good results, the methylol amino triazines, e. g., mono-, di-, tri-, tetra-, penta-, and hexa-methylol melamines; the methylol amino diazines, e. g., trimethylol 1,3,5-triamino pyrimidine; the amino triazoles, e. g., dimethylol guanazole, etc. mixtures of these materials or mixtures of an aldehyde with such materials may also be used.

The ratio of aldehydic reactant to the urea derivatives of this invention may be varied over a wide range but ordinarily is of the order corresponding to at least one mol of the aldehyde, or an equivalent amount of an aldehyde engendering- or addition products, for each mol of the urea derivative. Thus, I may use, for example, from one to five or six mols, preferably 3 mols, of an aldehyde for each mol of the derivatives.

In producing these various condensation products, dyes, pigments, plasticizer, mold lubricants, opacifiers, and various fillers (e. g. wood flour, glass fibers, asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc. are coated and impregnated with the resin, superimposed and thereafter united under heat and pressure. They may be used in the production of wire or baking enamels, for bonding or cementing together mica flames to form a laminated mica article, for bonding together abrasive grains in the production of resin-bonded abrasive articles such, for instance, as grindstones, sandpapers, etc. They also may be employed for treating cotton, linen, and other cellulosic materials in sheet or other form or as impregnants for electrical coils and for other electrically insulating applications.

What I claim as new and desire to secure by Letters Patent of the United States, is:—

1. A composition comprising the product of reaction of melamine, formaldehyde, and an organic compound of the formula RHNCYNR(CHR'NRCYNR)$_n$H where Y is a member of the class consisting of oxygen and sulphur, R' is a member of the class consisting of hydrogen and monovalent hydrocarbon radicals of not more than six carbon atoms, R is a member of the class consisting of hydrogen, monovalent hydrocarbon radicals, and monovalent halogeno-substituted hydrocarbon radicals and $n$ is an integer and is at least 1 and not more than 2.

2. A heat-curable composition comprising the heat-convertible product of reaction of (1) a partial condensation product of ingredients comprising melamine, an aldehyde and an organic compound of the general formula RHNCYNR(CHR'NRCYNR)$_n$H where Y is a member of the class consisting of oxygen and sulphur, R' is a member of the class consisting of hydrogen and a monovalent hydrocarbon radical of not more than six carbon atoms, R is a member of the class consisting of hydrogen and monovalent hydrocarbon and halogeno-hydrocarbon radicals and $n$ is an integer and is at least 1 and not more than 2, and (2) an alpha, beta-dichloropropionitrile.

3. A product comprising the heat-cured composition of claim 2.

4. The method of preparing new condensation products which comprises effecting reaction between ingredients comprising melamine, an aldehyde and an organic compound corresponding to the formula RHNCYNR(CHR'NRCYNR)$_n$H where Y is a member of the class consisting of oxygen and sulphur, R' is a member of the class consisting of hydrogen and monovalent hydrocarbon radicals of not more than six carbon atoms, R is a member of the class consisting of hydrogen and monovalent hydrocarbon and halogeno-hydrocarbon radicals and $n$ is an integer and is at least 1 and not more than 2.

GAETANO F. D'ALELIO.

CERTIFICATE OF CORRECTION.

Patent No. 2,339,621.  January 18, 1944.

GAETANO F. D'ALELIO.

It is hereby certified that error appears in the printed specification of the above numbered patent requiring correction as follows: Page 2, first column, line 69, for "coil-modified" read --oil-modified--; page 3, second column, line 34, for the word "has" read --had--; line 47, in the table, last column thereof, for "145.0" read --157.0--; line 51, for "was" read --were--; page 4, first column, line 50, strike out "of" before --resin--; and that the said Letters Patent should be read with this correction therein that the same may conform to the record of the case in the Patent Office.

Signed and sealed this 18th day of April, A. D. 1944.

Leslie Frazer

Acting Commissioner of Patents.

(Seal)